ained in the U.S. Patent 4,286,015
Yoshida et al. [45] Aug. 25, 1981

[54] POLYARYL ETHER SULFONE SEMIPERMEABLE MEMBRANE AND PROCESS FOR PRODUCING SAME

[75] Inventors: Koichi Yoshida, Fuji; Fusakazu Hayano, Chigasaki; Yoshiro Ii, Fuji, all of Japan

[73] Assignee: Asahi Kasei Kogyo Kabushiki Kaisha, Osaka, Japan

[21] Appl. No.: 35,095

[22] Filed: May 1, 1979

[30] Foreign Application Priority Data

May 2, 1978 [JP] Japan .................................. 53-52919

[51] Int. Cl.$^3$ .......................... B32B 3/26; B32B 5/18; B01D 39/14
[52] U.S. Cl. .............................. 428/305; 210/500 M; 260/30.4 R; 264/41; 264/177 R; 264/178 R; 264/204; 264/209; 428/332; 428/335; 428/336; 428/398; 428/419;
[58] Field of Search .............. 428/419, 305, 304, 398, 428/332, 335, 336; 210/500 R, 500 M; 252/316; 55/158; 260/30.4 R; 264/41, 177 R, 178 R, 204, 209

[56] References Cited

U.S. PATENT DOCUMENTS

| 3,567,810 | 3/1971 | Baker .......................... 210/500 M X |
| 3,615,024 | 10/1971 | Michaels ........................ 210/500 M |
| 3,639,306 | 2/1972 | Sternberg et al. ............... 252/316 X |
| 3,691,068 | 9/1972 | Cross ........................... 210/500 M X |
| 3,709,774 | 1/1973 | Kimura ............................. 428/305 |
| 3,709,841 | 1/1973 | Quentin ...................... 210/520 M X |
| 3,762,136 | 10/1973 | Kimura ............................. 55/158 |
| 4,051,300 | 9/1977 | Klein et al. ...................... 428/398 |

Primary Examiner—Thomas J. Herbert, Jr.
Attorney, Agent, or Firm—Finnegan, Henderson, Farabow, Garrett & Dunner

[57] ABSTRACT

A semipermeable membrane made of a polyaryl ether sulfone comprised of recurring units represented by the general formula (I):

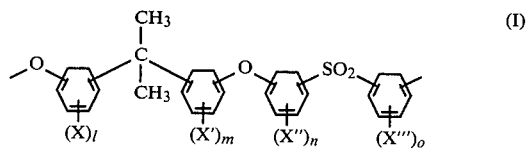

wherein X, X', X" and X'" are non-dissociative substituents, and l, m, n and o are integers of from 0 to 4. The membrane, which is composed of a single continuous polymer phase, has pores of a diameter increasing progressively and continuously from the surface layers to the center portion thereof.

The membrane is prepared by the process wherein:
the polyaryl ether sulfone is dissolved in a mixed solution to form a dope of the polyaryl ether sulfone;
the polyaryl ether sulfone dope is extruded to form a fiber or film and, then;
both sides of the fiber or film are contacted with a liquid miscible with the mixed solvent but incapable of dissolving the polyaryl ether sulfone to remove substantially all the mixed solvent from the fiber or film.

8 Claims, 8 Drawing Figures

POLYARYL ETHER SULFONE SEMIPERMEABLE MEMBRANE AND PROCESS FOR PRODUCING SAME

BACKGROUND OF THE INVENTION

1. Field of the Invention

This invention relates to a novel polyaryl ether sulfone semipermeable membrane and a process for producing the same.

2. Description of the Prior Art

Many high molecular weight compounds are used for the production of semipermeable membranes, which include for example cellulose acetate, polyacrylonitrile and polyamide. Polyaryl ether sulfone is also used for the semipermeable membrane application because of its good resistance to heat and chemicals, although it has primarily been used as engineering plastics. Polyaryl ether sulfone semipermeable membranes are disclosed in U.S. Pat. Nos. 3,567,810, 3,615,024, 3,639,306 and 3,691,068, assigned to Amicon Corporation; U.S. Pat. No. 4,051,300 assigned to Gulf South Research Institute; U.S. Pat. No. 3,709,841 assigned to Phone-Poulenc S.A.; U.S. Pat. Nos. 3,762,136 and 3,709,774, and British Pat. No. 1,295,585 assigned to General Electric Co., Tomoegawa Paper-Manufacturing Co.'s Japanese Laid-open Patent Application 28,581/1976, and; Journal of Applied Polymer Science, 20, 2377–2394 and 2395–2406(1976), ibid 21, 1883–1900(1977). Of these polyaryl ether sulfone semipermeable membranes, Gulf Research Institute's membranes were developed for use in reverse osmosis and are characterized as exhibiting a very low permeability to water, although pores on both surfaces of the membranes are large, i.e., 250 angstroms to 0.44 micron in pore diameter. The water permeability of the membranes is at most 1.3 m³/m².day.kg/cm² and, hence, of little practical use in ultrafiltration. The known semipermeable membranes other than Gulf Research Institute's membranes are characterized as possessing a thin relatively dense surface layer on the adjacent first major surface of the membranes, but no such surface layer on the second major surface thereof. Since voids of a diameter exceeding 10 microns are exposed on the second major surface, these known semipermeable membranes have the defects that:

(1) they are poor in mechanical strength;

(2) they are difficult or even impossible to back-wash; and (3) they are liable to be plugged or fouled.

In general, semipermeable membranes made of a relatively hydrophilic polymer, such as polyacrylonitrile or sulfonated polysulfone, exhibit a large permeability to water. In contrast, semipermeable membranes made of a relatively hydrophobic polymer, such as polyaryl ether sulfone, exhibit a small permeability to water. If it is intended to provide polyaryl ether sulfone semipermeable membranes of an increased water permeability, the membranes must be of a special structure, such as, for example, an anisotropic structure comprised of a dense surface layer and a support layer integrated with the surface layer. Such an anisotropic structure is often seen in polyacrylonitrile, sulfonated polysulfone and cellulose acetate semipermeable membranes. The surface layer of the anisotropic semipermeable membrane is a thin, relatively dense barrier layer defining the permeability to water. The support layer of the anisotropic semipermeable membrane is a much more coarsely porous layer through which fluid can pass with little hydraulic resistance. However, such an anisotropic semipermeable membrane is not able to withstand the hydraulic compressional force very well, is liable to become consolidated and, also is poor in mechanical strength.

SUMMARY OF THE INVENTION

A principal object of the present invention is to provide semipermeable membranes which are characterized by possessing the two surface layers having no voids therein exceeding 10 microns in diameter, and which exhibit a high hydraulic permeability, are able to withstand the hydraulic compressional force very well and have good mechanical strengths.

A further object of the present invention is to provide semipermeable membranes which exhibit enhanced water permeability and enhanced retention cut-off of protein in ultrafiltration of an aqueous protein solution, the water permeability and the retention cut-off of protein in ultrafiltration not significantly decreasing with time.

In one aspect of the present invention, there is provided a polyaryl ether sulfone semipermeable membrane made of a polyaryl ether sulfone comprised of recurring units represented by the general formula (I):

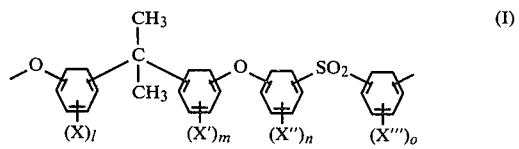

wherein X, X', X" and X''', which may be identical to or different from each other, are non-dissociative substituents, and l, m, n and o, which may be identical to or different from each other, are integers of from 0 to 4, which membrane has pores of a diameter increasing progressively and continuously from first and second major surfaces of the membrane to the center portion thereof, which center portion is located approximately equidistant from the first and second major surfaces, and the membrane is comprised of a single continuous polymer phase; the diameter of the pores present on or in the immediate proximity of the first and second major surfaces being such that the percentage rejection of dextran molecules having an average molecular weight of 10,000 is not greater than 95% and the percentage rejection of dextran molecules having an average molecular weight of 500,000 is at least 5%; and the average diameter of pores present in said center portion being in the range of from 0.05 to 10 microns.

In another aspect of the present invention, there is provided a process for producing the above-mentioned polyaryl ether sulfone semipermeable membrane, which process comprises the steps of:

dissolving the polyaryl ether sulfone in a mixed solution comprised of (1) an electrolyte or an aqueous electrolyte solution and (2) a mixed solvent of (2-1) an organic polar solvent capable of dissolving the polyaryl ether sulfone and (2—2) a liquid miscible with the organic polar solvent but incapable of dissolving the polyaryl ether sulfone, thereby forming a dope of the polyaryl ether sulfone;

extruding the polyaryl ether sulfone dope through a circular or linear slit of a nozzle to obtain a fiber or film; and then, contacting both sides of the fiber or film with a liquid miscible with said mixed solvent but incapable of dissolving the polyaryl ether sulfone, thereby removing substantially all the mixed solvent from the fiber or film to obtain the membrane.

BRIEF DESCRIPTION OF THE DRAWINGS

The characteristics of the semipermeable membrane of the invention will be apparent from the following description and the accompanying drawings wherein.

DETAILED DESCRIPTION OF THE PREFERRED EMBODIMENTS

Figure 1:
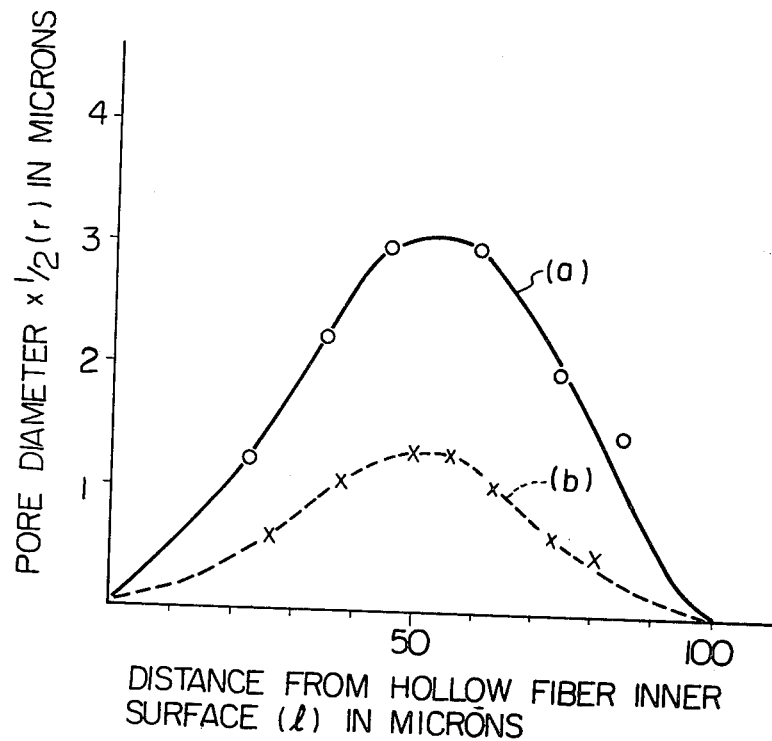
FIG. 1 is composed of curves showing the relationship of the pore diameter with the distance from the inner surface of a hollow fiber.

The polyaryl ether sulfone according to the invention is comprised of recurring units represented by the general formula (I):

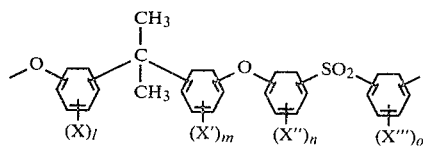

wherein X, X', X" and X'", which may be identical to or different from each other, are non-dissociative substituents, for example, alkyl groups, such as methyl and ethyl, and halogen, such as chlorine and bromine; and l, m, n and o, which may be identical to or different from each other, are integers of from 0 to 4. A preferable polyaryl ether sulfone is that which has the recurring units represented by the formula (II):

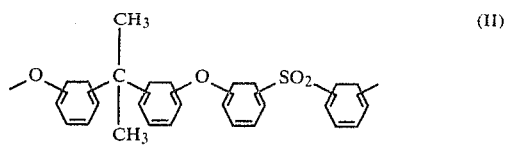

Particularly, a polyaryl ether sulfone having the recurring units represented by the formula (III) is advantageous because it is readily available.

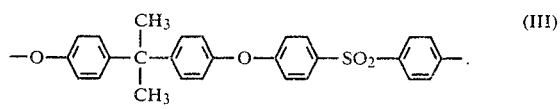

The polyaryl ether sulfone preferably possesses a number average molecular weight of from 5,000 to 50,000 as determined according to the osmotic pressure method.

The process for producing the polyaryl ether sulfone semipermeable membrane of the invention will now be illustrated.

First, a dope of the polyaryl ether sulfone is prepared by dissolving the polyaryl ether sulfone in a mixed solution comprised of: (1) an electrolyte or an aqueous electrolyte solution; and (2) a mixed solvent of (2-1) an organic polar solvent capable of dissolving the polyaryl ether sulfone and (2-2) a liquid miscible with the organic polar solvent but incapable of dissolving the polyaryl ether sulfone (which liquid is hereinafter referred to as "non-solvent" for brevity).

The electrolyte used includes, for example, metal salts of an inorganic acid, such as sodium chloride, sodium nitrate, potassium nitrate, sodium sulfate and zinc chloride; metal salts of an organic acid, such as sodium acetate and sodium formate; polyelectrolytes, such as sodium-polystyrene-sulfonate and polyvinylbenzyltrimethylammonium chloride; and ionic surface active agents, such as sodium dioctylsulfosuccinate and sodium N,N-alkylmethyltaurate. These electrolytes may be incorporated in the mixed solvent as they are. It is, however, preferable that the electrolytes in the form of an aqueous solution be mixed with the mixed solvent. The amount of the aqueous electrolyte solution is not particularly limited, provided that a mixture of the aqueous electrolyte solution with the mixed solvent forms a uniform solution, and such amount is usually in the range of from 0.5% to 10% by volume based on the volume of the mixed solvent. The concentration of the aqueous electrolyte solution is also not particularly limited, although a high concentration is preferable. The concentration of the aqueous electrolyte solution is usually in the range of from 1 to 60% by weight.

Various organic polar solvents may be used. However, N-methylpyrrolidone, dimethylformamide and dimethylacetamide are preferable. These solvents may be used alone or in combination. As the non-solvent to be mixed with the organic polar solvent, various non-solvents may be used, but dimethylsulfoxide and propylene glycol are preferable. These non-solvents may also be used alone or in combination. The proportion of the non-solvent to the organic polar solvent may be arbitrarily set provided that the mixture of the aqueous electrolyte solution with the organic polar solvent/non-solvent mixture forms a uniform solution, and such amount is usually in the range of from 5% to 50% by weight.

The concentration of the polyaryl ether sulfone in the dope is in the range of from 5% to 35% by weight, preferably from 10% to 30% by weight. When the concentration of the polymer exceeds approximately 35% by weight, the resulting semipermeable membrane is poor in water permeability. In contrast, when the polymer concentration is lower than approximately 5% by weight, the resulting semipermeable membrane exhibits poor mechanical strength.

The polymer dope is extruded through a circular or linear slit of a nozzle to form a fiber or film in the form of, for example, a hollow fiber or a flat film. The fiber or film so formed is contacted at both sides thereof by a coagulating liquid which is miscible with the mixed solvent but incapable of dissolving the polyaryl ether sulfone. As a result, substantially all of the mixed solvent is removed from the film to form a semipermeable membrane. The polymer dope may be directly extruded into a bath of a coagulating liquid. Alternatively, the polymer dope may be extruded into a gaseous environment and, immediately thereafter, brought into contact with a coagulation liquid.

In the case where a membrane in the form of a hollow fiber is produced, the polymer dope may preferably be extruded through a circular slit of a nozzle, conventionally employed for the production of hollow fibers, into a bath of a coagulating liquid, in a manner such that a coagulating liquid flows within the tubular extrudate. In the case where a membrane in the form of a flat film is produced, the polymer dope may preferably be extruded through a linear slit of a nozzle into a bath of a coagulating liquid.

As the coagulating liquid, water is most popularly used. Other liquids, which are miscible with the mixed solvent, but incapable of dissolving the polyaryl ether sulfone, may also be used. Such liquids include, for example, methanol, ethanol, ethylene glycol, glycerol, propylene glycol, ethylenediamine and formic acid. These coagulating liquids may be used alone or in combination. Different coagulating liquids may be applied to the first and second major surfaces of the extruded fiber or film.

One main point of the process for producing the membrane of the invention resides in the medium of the polymer dope. It is presumed that a semipermeable membrane is formed in a manner such that the polyaryl ether sulfone in the form of a solution in an organic polar solvent precipitates on the peripheries of non-solvent droplet cores, due to the penetration of a coagulating liquid into the inside of the film through the first and second major surfaces thereof, and that gaps between the non-solvent droplets become pores. The non-solvent is crucial as cores of the polymer precipitate, and thus, the water permeability of the resulting membrane is approximately two to ten times greater as compared with that of the membrane obtained without the use of the non-solvent. Furthermore, it is presumed that the electrolyte upon coagulation favorably affects the extension of the polymer chains and thus favorably affects the membrane structure. That is, due to the presence of the electrolyte, the polymer in the dope is unstable and tends to precipitate readily upon contact with a coagulation liquid. This leads to the formation of the two surface layers having no voids therein.

The polyaryl ether sulfone semipermeable membrane produced by the above-mentioned process possesses two surface layers having micropores but having no voids, adjacent to the first and second major surfaces, and a layer with pores located between the two surface layers. The term "pores" or "micropores" used herein refers to minute openings having an average diameter of not greater than 10 microns, and the term "voids" used herein refers to openings having an average diameter exceeding 10 microns. The pore diameter increases progressively and continuously from the first and second major surfaces of the membrane to the center portion thereof located approximately equidistant from the first and second major surfaces. Thus, the two surface layers and the medial layer form a single continuous polymer phase. This continuous change in the pore diameter can be observed by using a scanning or transmitting electron microscope.

The diameter of the pores present in the two surface layers, i.e., present on or in immediate proximity to the first and second major surfaces, can be determined by measuring the percentage cut-off (i.e., rejection) of dextran molecules of various molecular weights, or the percentage cut-off of various proteins, when aqueous solutions of these materials are passed through the semipermeable membrane; or by observing regions adjacent to the major surfaces by using a transmitting electron microscope. The diameter of the pores present on or in immediate proximity to the major surfaces is such that the percentage cut-off of dextran molecules having an average molecular weight of 10,000 is not greater than 95% and the percentage cut-off of dextran molecules having an average molecular weight of 500,000 is at least 5%. This range of the percentage cut-off of dextran molecules corresponds approximately to the range of the pore diameter of from 20 to 150 angstroms. From the standpoints of mechanical strengths and hydraulic permeability, the pore diameter is preferably such that the percentage cut-off of dextran molecules having an average molecular weight of 70,000 is in the range of from 5% to 95%. This preferable range of the percentage cut-off of dextran molecules corresponds roughly to the range of the pore diameter of from 30 to 70 angstroms. The thickness of each surface layer, i.e., each region adjacent to the respective major surfaces, wherein no voids are present, is usually in the range of from approximately one to five microns.

In general, the smaller the thickness of the membrane, the smaller the number of voids present therein. A semipermeable membrane of smaller than 100 microns in thickness has a significantly reduced number of voids therein. A semipermeable membrane having no voids throughout the entire thickness can be produced by suitably selecting the production conditions. The semipermeable membrane having no voids is capable of well withstanding the hydraulic pressure and exhibits enhanced mechanical strengths and water permeability.

Whether or not voids are present in the semipermeable membrane, the pore diameter increases progressively and continuously from the major surfaces to the center portion and becomes minimum in the center portion. The average pore diameter in the center portion is in the range of from 0.05 to 10 microns. Such a progressive and continuous increase in the pore diameter seems to be due to the fact that the coagulation speed of polymer decreases progressively from the two major surfaces toward the center portion.

The above-mentioned relationship of the pore diameter with the distance from one of the major surfaces of the membrane is exemplified in FIG. 1, wherein the ordinate and the abscissa indicate the pore diameter ×½ (r: in microns and the distance (l: in microns) from the inner surface of a hollow fiber having a wall thickness of 100 microns, respectively. Curves (a) and (b) correspond to hollow fibers obtained separately from a 14.7 wt.% polymer dope and a 15.7 wt.% polymer dope, respectively, by the procedure mentioned in Example 1, below.

The semipermeable membrane of the invention exhibits a water permeability of 1.5 to 30 m³/m².day.kg/cm². Particularly, a thin semipermeable membrane, which is obtained by using a polymer dope of a low concentration, exhibits a very large water permeability. The water permieability is in inverse proportion to the wall thickness of the membrane as shown by curve (a) in FIG. 2, which curve was plotted from data on hollow fibers obtained in Example 5, below. A similar inversely proportional relationship was also found on flat membranes.

It is said that, in conventional anisotropic semipermeable membranes made of polyacrylonitrile, sulfonated polysulfone, polycarbonate or cellulose acetate, the water permieability is defined by the surface or skin layer. In contrast, it is presumed that the semipermeable membrane of the invention exhibits a hydraulic resistance throughout the entire thickness of the membrane and, therefore, the water permeability is defined by the entire thickness. This will be apparent from the following phenomena. That is, firstly, the water permeability of the polyaryl ether sulfone semipermeable membranes is in reverse proportion to the thickness thereof, in spite of the fact that the semipermeable membranes prepared under similar conditions possess, even though the membranes are different in thickness, surface pores of an approximately similar diameter and, furthermore, relatively dense surface layers of an approximately similar thickness, which fact can be found by filtration tests wherein the percentage cut-off of dextrans of different molecular weights and of various proteins is measured or by the observation of electron microphotographs. Secondly, the polyaryl ether sulfone semipermeable membranes exhibit high water permeabilities although the membranes possess the relatively dense surface layers having no voids therein.

The advantages of the semipermeable membranes of the invention are summarized as follows.

(1) The membranes exhibit a relatively high water permeability. The water permeability can be extremely enhanced by reducing the thickness of the membranes.

(2) Since the membranes posses relatively dense surface layers having no voids therein, it is possible to back-wash the membranes, and furthermore, the membranes are able to withstand the hydraulic compressional force very well and have good mechanical strengths.

(3) The water permeability of the membranes does not significantly decrease with time. Thus, the high ultrafiltration rate of, for example, blood, serum or various aqueous protein solutions, can be ensured over a long period of time.

The semipermeable membranes of the invention are useful in applications wherein conventional semipermeable membranes are used. Particularly, membranes in the form of hollow fibers possess a small priming volume and an enhanced surface area per unit volume and, hence, the filtration apparatus can be smaller as compared with conventional filtration apparatuses. Thus, the membranes are useful, particularly, for example, for water treatments and various medical treatments (for example, as artificial kidney and membranes for concentrating abdominal ascites).

The invention will be further illustrated by the following examples wherein percentages are by weight unless otherwise specified.

In the examples, the percentage cut-off of dextran was determined on an aqueous 5% solution at a temperature of 20° C., and the water permeability was determined at a temperature of 20° C.

EXAMPLE 1

2 ml of an aqueous 50% sodium nitrate solution were incorporated in a mixed solution comprised of 54 g of N-methylpyrrolidone and 29 g of dimethylsulfoxide to obtain a uniform solution. A polyaryl ether sulfone comprised of recurring units represented by the formula (III), hereinbefore referred to, and having a number average molecular weight of approximately 25,000, as determined according to the osmosis method, was dissolved in the so obtained solution, whereby two polymer dopes were prepared which had a polymer concentration of 14.7% and 15.7%, respectively. The viscosity of the two polymer dopes were 860 and 1,300 centipoises at a temperature of 20° C., respectively. Each polymer dope was extruded through a circular slit of a nozzle of the type which was conventionally used for the production of hollow fibers, into a water bath while water was introduced inside the tubular extrudate, whereby a semipermeable membrane in the form of a hollow fiber having an inner diameter of 0.2 mm and an outer diameter of 0.4 mm was obtained.

The pore diameter distribution was evaluated for the two membranes, so obtained, by the scanning and transmitting electron microphotographs. The evaluation results are shown in FIG. 1.

The two membranes had voids in the medial layer between the relatively dense surface layers. The percentages cut-off of dextran molecules having an average molecular weight of 10,000, 500,000 and 70,000 were 2%, 98% and 64%, respectively, as determined for the membrane obtained from the 15.7% polymer dope. The percentages cut-off of the three types of dextran molecules were 1%, 93% and 40%, respectively, as determined for the membrane obtained from the 14.7% polymer dope. The water permeabilities determined for the membranes obtained from the 15.7% polymer dope and the 14.7% polymer dope were 16.0 m³/m².day.kg/cm² and 20.0 m³/m².day.kg/cm², respectively.

EXAMPLE 2

28 g of an aqueous 20% sodium acetate solution were incorporated in a mixed solution comprised of 373 g of N-methylpyrrolidone and 201 g of dimethylsulfoxide to obtain a uniform solution. 108.7 g of a polyaryl ether sulfone, similar to that used in Example 1, were dissolved in the so obtained solution, thereby to prepare a polymer dope having a viscosity of 1080 centipoises at 20° C. From this polymer dope, a semiphermeable membrane in the form of a hollow fiber having an inner diameter of 0.2 mm and an outer diameter of 0.4 mm was produced in a manner similar to that mentioned in Example 1.

The permeability of the membrane to deionized water was 15.0 m³/m².day.kg/cm². Observation of a cross-section of the membrane by using an electron microscope showed that the pore diameter increased progressively and continuously from the two major surfaces toward the center portion, and further, that the membrane had voids between the relatively dense surface layers. The average diameter of the pores present in the center portion was approximately one micron. The percentages cut-off of dextran molecules having an average molecular weight (M.W.) of 10,000 and 500,000 were 3% and 98%, respectively. The percentages cut-off of dextran molecules of an average M.W. of 70,000 and 40,000 were 63% and 24%, respectively, which percentages cut-off correspond to the pore-diameters of 46 angstroms and 45 angstromes, respectively.

EXAMPLE 3

80 ml of an aqueous 50% sodium nitrate solution were incorporated in a mixed solution comprised of 2,620 ml of dimethylacetamide and 1,300 ml of dimethylsulfoxide to obtain a uniform solution. 750 g of a polyaryl ether sulfone, similar to that used in Example 1, were dissolved in the so obtained solution thereby to prepare a polymer dope. From this polymer dope, a semipermeable membrane in the form of a hollow fiber having an inner diameter of 0.2 mm and an outer diameter of 0.4 mm was produced in a manner similar to that mentioned in Example 1.

Observation of the corss-section of a membrane by using an electron microscope showed that the pore diameter increased progressively and continuously from the two major surfaces toward the center portion, and further, that the membrane had voids between the relatively dense surface layers. The average diameter of the pores present in the center portion was approximately three microns. The permeability of the membrane to deionized water was 10.5 m$^3$/m$^2$.day.kg/cm$^2$. This water permeability was very much larger than that of the membrane in the form of a hollow fiber, i.e., 0.8 m$^3$/m$^2$.day.kg/cm$^2$, which was produced by a procedure similar to that mentioned above, except that water was used in place of the aqueous 50% sodium nitrate solution.

The percentages cut-off of dextran molecules having an average M.W. of 10,000, 500,000 and 70,000 were 2%, 96% and 48%, respectively. The percentages cut-off of cyto-chrome C in ultrafiltrations of bovine serum albumin and of horse heart were 99% and 85%, respectively.

EXAMPLE 4

2 ml of an aqueous 50% sodium nitrate solution were incorporated in a mixed solution comprised of 54 g of N-methylpyrrolidone and 29 g of dimethylsulfoxide to obtain a uniform solution. 10 g of a polyaryl ether sulfone, similar to that used in Example 1, were dissolved in the so obtained solution, thereby to obtain a polymer dope. The polymer dope was extruded through a nozzle with a linear slit having 30 microns width into a water bath to form a membrane in the form of a flat film. The membrane had a thickness of 25 microns.

Observation of a cross-section of the membrane by an electron microscope showed that the membrane had two relatively dense surface layers adjacent to the first and second major surfaces, which surface layers had pores but no voids therein, and a medial layer between the two surface layers, which medial layer had voids therein. The average pore diameter increased progressively and continuously from the first and second major surfaces toward the center portion. The average diameter of the pores present in the center portion was approximately 9 microns. The percentages cut-off of dextran molecules having a M.W. of 10,000, 500,000 and 70,000 were 0%, 10% and 2%, respectively, which percentages correspond to the pore diameter of approximately 125 angstroms. The water permeability was 35 m$^3$/m$^2$.day.kg/cm$^2$.

EXAMPLE 5

2 ml of an aqueous 50% sodium nitrate solution were incorporated in a mixed solution comprised of 54 g of N-methylpyrrolidone and 29 g of dimethylsulfoxide to obtain a uniform solution. 16 g of a polyaryl ether sulfone, similar to that used in Example 1, were dissolved in the so obtained solution, thereby to obtain a polymer dope having a viscosity of 1,300 centipoises at 20° C. The polymer dope was extruded through a nozzle with a circular slit in a manner similar to that in Example 1, wherein the extrusion rate and the take-off speed were changed so that various membranes in the form of hollow fibers having a wall thickness ranging from 30 microns to 350 microns were formed.

Figure 2:
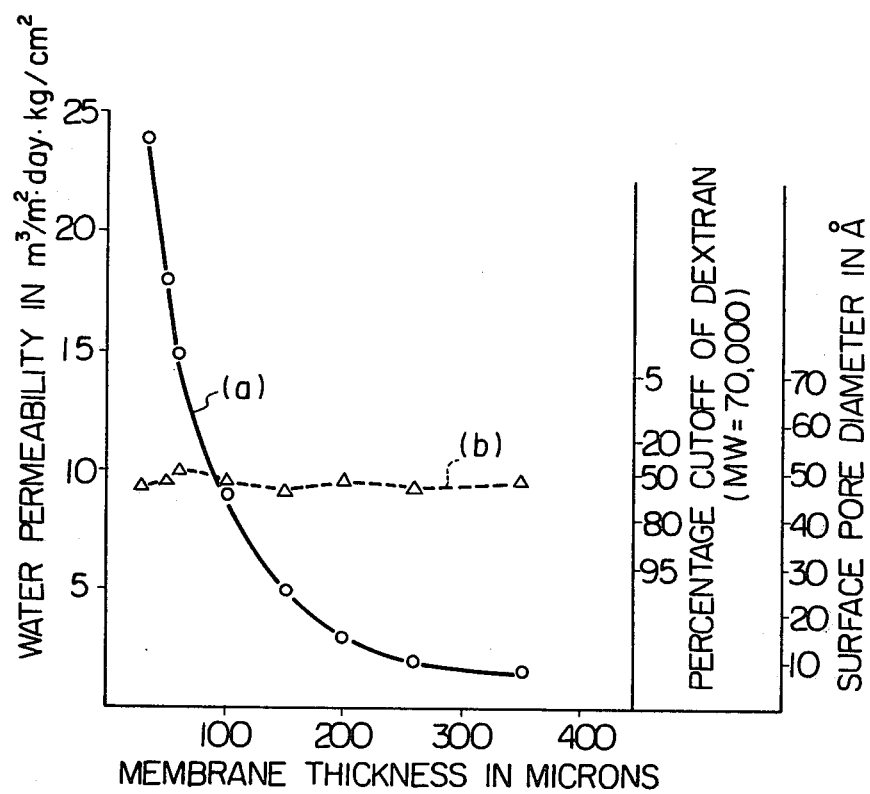
FIG. 2 is composed of curves showing the relationship of the water permeability, the surface pore diameter and the percentage cut-off of dextran molecules having a molecular weight of 70,000, with the membrane thickness.

The water permeability of the membranes was evaluated. The relationship of the water permeability to the membrane thickness was as shown in FIG. 2, curve(a). The percentage cut-off of dextran molecules having an average M.W. of 70,000 was evaluated. The relationship of the percentage cut-off of dextran molecules and the surface pore diameter to the membrane thickness was as shown in FIG. 2, curve(b).

The percentages cut-off of dextran molecules having an average M.W. of 10,000 and 500,000 were in the range of from 2 to 3% and in the range of from 97 to 98%, respectively. The average diameters of the pores present in the center portions of the membranes having a thickness of 30 microns and 350 microns were approximately 0.5 micron and approximately 5 microns, respectively. The membrane having a thickness of 30 microns had few or no void therein.

Figure 3:
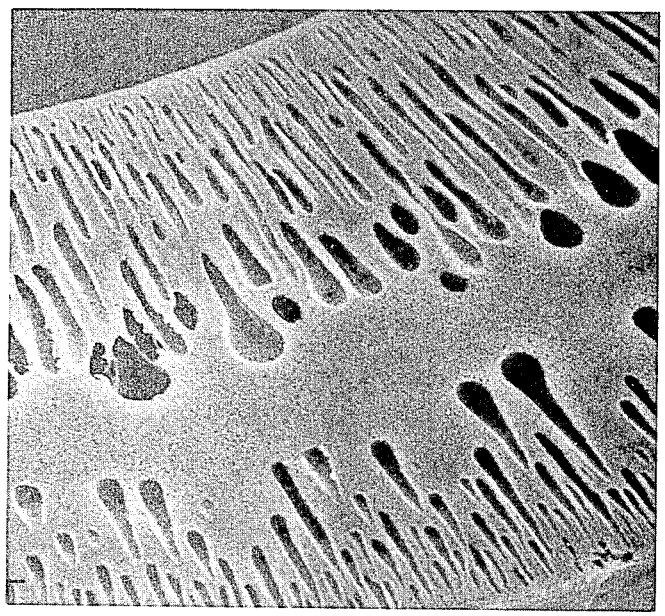
FIG. 3 is an electron micro photograph (magnification: 240x) taken of the cross-section of the membrane (thickness: 260 microns) in the form of a hollow fiber obtained in Example 5, below.
Figure 4:
FIG. 4 is an electron micro-photograph (magnification: 27,500x) taken of a portion of the cross-section of the membrane (thickness: 260 microns) in the form of a hollow fiber obtained in Example 5, below, which portion is in the immediate proximity of the inner surface of the membrane.

An electron micro-photograph (magnification: 240×) taken of a cross-section of the membrane having a thickness of 260 microns is shown in FIG. 3. An electron microphotograph (magnification: 27,500×) taken of a portion of a cross-section of the same membrane, which portion was in the immediate proximity of the inner surface of the membrane, is shown in FIG. 4.

EXAMPLE 6

2 ml of an aqueous 50% nitrate solution were incorporated in a mixed solution comprised of 54 g of N-methylpyrrolidone and 29 g of dimethylsulfoxide to obtain a uniform solution. A polyaryl ether sulfone similar to that used in Example 1, was dissolved in the so obtained solution at various concentrations, thereby to prepare four polymer dopes. The four dopes had a polymer concentration of 14.7, 15.0, 15.3 and 15.7% and a viscosity of 860, 1,000, 1,150 and 1,300 centipoises, respectively. From these polymer dopes, semipermeable membranes in the form of hollow fibers were produced in a manner similar to that mentioned in Example 1. All of the membranes, so produced, had an inner diameter of 0.2 mm and an outer diameter of 0.4 mm, and a thickness of 100 microns.

These membranes had a structure such that the pore diameter increased progressively and continuously from the first and second major surfaces toward the center portion. The average pore diameters in the respective center portions were from one to four microns. The membranes had voids between the relatively dense surface layers. Other chracteristic's of these membranes are shown in Table I, below.

TABLE I

| Polymer dope concentration (wt. %) | Water permeability ($m^3/m^2 \cdot day \cdot kg/cm^2$) | Surface pore diameter (angstroms) | % Cut-off of dextran MW = 70,000 | % Cut-off of dextran MW = 10,000 | % Cut-off of dextran MW = 500,000 |
| --- | --- | --- | --- | --- | --- |
| 14.7 | 15.8 | 55 | 30 | 0 | 90 |
| 15.0 | 13.5 | 53 | 36 | 1 | 95 |
| 15.3 | 11.8 | 51 | 43 | 1 | 96 |
| 15.7 | 9.0 | 48 | 57 | 2 | 97 |

EXAMPLE 7

2 ml of an aqueous 50% sodium nitrate solution were incorporated in a mixed solution comprised of 54 g of N-methylpyrrolidone and 29 g of dimethylsulfoxide to obtain a uniform solution. 16 g of a polyaryl ether sulfone similar to that used in Example 1 were dissolved in the so obtained solution thereby to obtain a polymer dope having a viscosity of 1,300 centipoises at 20° C. The polymer dope was extruded through a nozzle with a circular slit in a manner similar to that in Example 1 whereby a semipermeable membrane in the form of a hollow fiber was produced.

The membrane had a thickness of 100 microns. The membrane had a structure such that the pore diameter increased progressively and continuously from the major surfaces toward the center portion. The average pore diameter in the center portion was approximately one micron. The membrane had voids between the relatively dense surface layers. The percentages cut-off of dextran molecules having an average M.W. of 10,000 and 500,000 were 2% and 98%, respectively.

Figure 5:
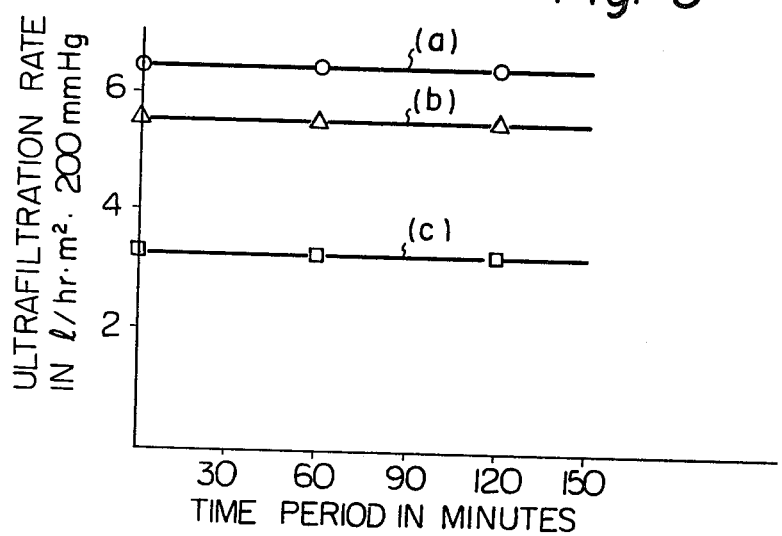
FIG. 5 is composed of graphs showing the relationship of the ultrafiltration rate of bovine fresh blood, bovine serum and an aqueous bovine serum albumin, with the time period of operation.

30 hollow fibers were bundled into a miniature module having a length of 7 cm. Using this module, bovine fresh blood, bovine serum and an aqueous 5% bovine serum albumin were separately ultrafiltration-treated at a hydraulic pressure of 200 mmHg (an average of the pressures in the inlet and outlet portions) and at a flow speed of 1 cm/sec. The relationship of the ultrafiltration rate ($l/hr.m^2.200$ mmHg) to the operation period of time (minutes) was as shown in FIG. 5, wherein graphs (a), (b) and (c) correspond to the aqueous 5% bovine serum albumin, bovine serum and bovine fresh blood, respectively. The determination of the ultrafiltration rate was carried out at 37° C. The bovine fresh blood used had a hematocrit value of 40% and, before the determination, was heparinized with 500 units of heparin per 100 ml of blood. The percentages cut-off of protein in all of these ultrafiltration treatments exceeded 99%.

Figure 6:
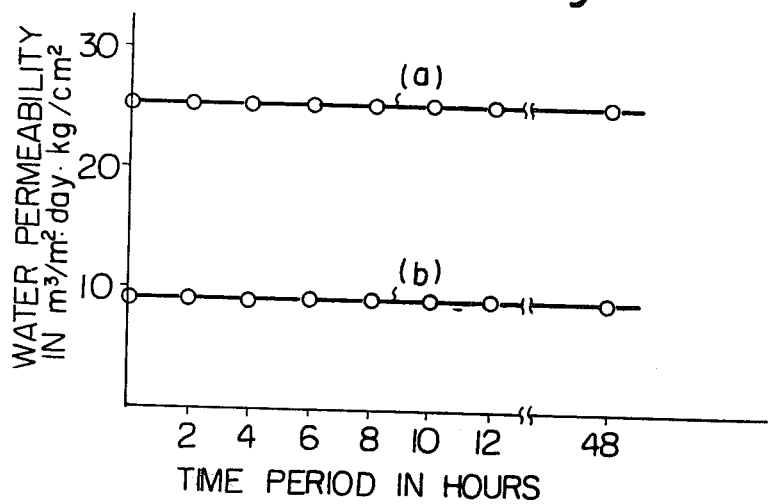
FIG. 6 is composed of graphs showing the relationship of the water permeability with the time period of operation and the temperature.

Using the above-mentioned module, the water permeability was determined at a hydraulic pressure of 1 kg/cm² (an average of the pressures in the inlet and outlet portions). The relationship of the water permeability ($m^3/m^2.day.kg/cm^2$) to the operation period of time (hours) was as shown in FIG. 6, wherein graphs (a) and (b) show data obtained at temperatures of 80° C. and 20° C., respectively.

Figure 7:
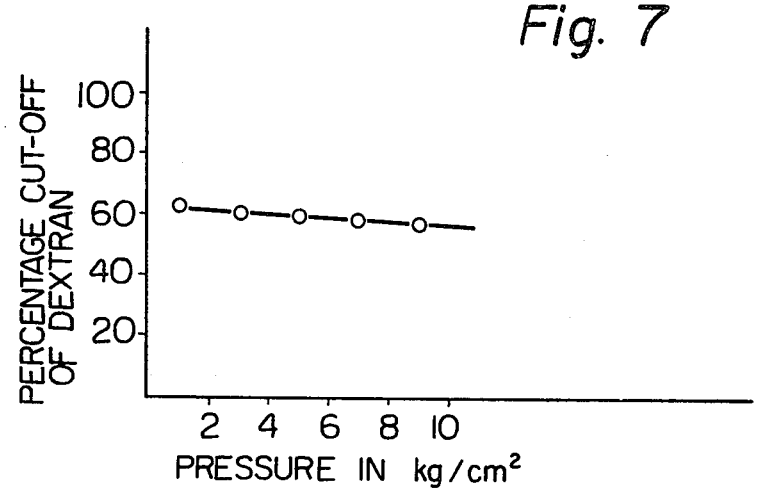
FIG. 7 is a graph showing the relationship of the percentage cut-off of dextran with the hydraulic pressure.

Furthermore, using the above-mentioned module, the percentages cut-off of dextran molecules having an average M.W. of approximately 70,000 was determined on the aqueous 5% solution thereof at a temperature of 20° C., wherein the hydraulic pressure (an average of the pressures of the inlet and outlet portions) was increased step by step, at intervals of 15 minutes, from 1 kg/cm² to 10 kg/cm². The result are shown in FIG. 7.

EXAMPLE 8

A polymer dope, similar to that prepared in Example 7, was extruded through a nozzle with a linear slit into a water bath, wherein the slit gap was changed so that flat membranes of various thicknesses were formed, with all other conditions remaining substantially the same as those in Example 7.

The membranes had two relatively dense surface layers adjacent to the first and second major surfaces, which surface layers had pores but no voids therein. The average pore diameter increased progressively and continuously from the first and second major surfaces toward the center portion. The average diameter of the pores present in the center portion was approximately 0.1 micron and approximately 5 microns, as determined for the membranes haveing a thickness of 25 microns and 155 microns, respectively. Among the membranes, those which had a thickness of not larger than 100 microns had few or no voids.

Figure 8:
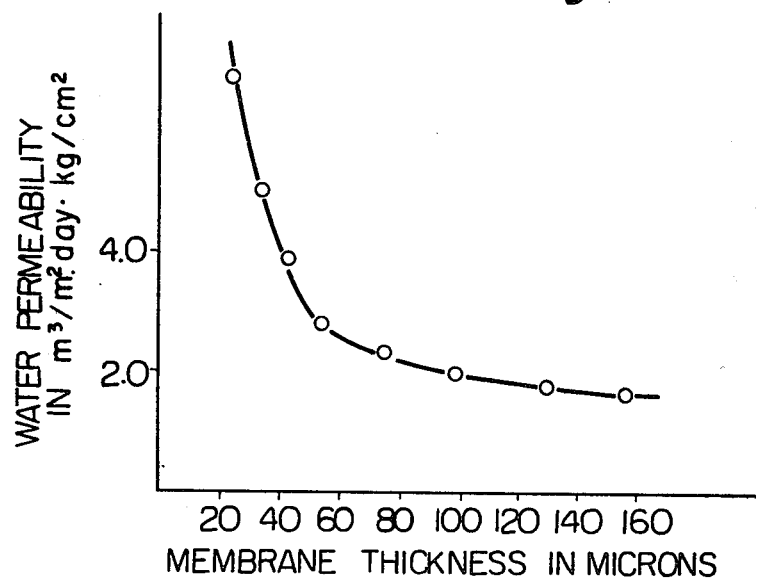
FIG. 8 is a graph showing the water permeability with the thickness of a flat membrane.

The water permeability was determined at a temperature of 20° C. and a pressure of 1 kg/cm². The results are shown in FIG. 8. The percentages cut-off of dextran molecules was determined for the membranes of 25 microns and 155 microns in thickness. The results are shown in Table II, below.

TABLE II

| Membrane thickness (microns) | % Cut-off of dextran MW = 10,000 | % Cut-off of dextran MW = 70,000 | % Cut-off of dextran MW = 500,000 |
| --- | --- | --- | --- |
| 25 | 2 | 55 | 97 |
| 155 | 2 | 50 | 96 |

EXAMPLE 9

2 ml of an aqueous 50% sodium nitrate solution were incorporated in a mixed solution comprised of 58 g of N-methylpyrrolidone and 15 g of dimethylsulfoxide to obtain a uniform solution. 25 g of a polyaryl ether solfone comprised of recurring units represented by the formula (III), hereinbefore mentioned, and having a number average molecular weight of approximately 40,000, were dissolved in the so obtained solution to prepare a polymer dope. A semipermeable membrane in the form of a hollow fiber was produced from the polymer dope in a manner similar that mentioned in Example 2. The hollow fiber had an inner diameter of 0.2 mm and an outer diameter of 0.4 mm.

Observation of a cross-section of the membrane by an electron microscope showed that the average pore diameter increased progressively and continuously form the first and second major surfaces toward the center portion. The average diameter of the pores present in the center portion was approximately 0.05 micron. The membrane had few or no voids therein. The water permeability was 1.0 m³/m².day.kg/cm². The percentages cut-off of dextran molecules having an average M.W. of 10,000 and 500,000 were 90% and 100%, respectively, which percentages cut-off correspond to the pore diameter of approximately 20 angstroms.

EXAMPLE 10

2 ml of an aqueous electrolyte solution shown in Table III, below, were incorporated in a mixed solution comprised of 54 g of N-methylpyrrolidone and 29 g of dimethylsulfoxide to obtain a uniform solution. 16 g of a polyaryl ether sulfone, similar to that used in Example 1, were dissolved in the so obtained solution, thereby to prepare a polymer dope. The polymer dope was extruded through a nozzle with a circular slit into a water bath, in a manner similar to that mentioned in Example 1, whereby a semipermeable membrane in the form of a hollow fiber having an inner diameter of 0.2 mm and an outer diameter of 0.4 mm was obtained.

Observation of a cross-section of each membrane by an electron microscope showed that the pore diameter increased progressively and continuously from the first and second major surfaces toward the center portion. The characteristics of each membrane are shown in Table III, below.

TABLE III

| Electrolyte | Wt. % | Water permeability m³/m² . day . kg/cm² | % Cut-off of dextran | | |
|---|---|---|---|---|---|
| | | | MW = 10,000 | MW = 70,000 | MW = 500,000 |
| Sodium nitrate | 50 | 16.0 | 2 | 64 | 98 |
| Sodium chloride | 20 | 6.5 | 4 | 75 | 98 |
| Potassium nitrate | 50 | 12.0 | 2 | 67 | 98 |
| Sodium sulfate | 50 | 10.5 | 1 | 55 | 97 |
| Zinc chloride | 30 | 5.8 | 1 | 51 | 96 |
| Sodium acetate | 10 | 4.3 | 1 | 50 | 96 |
| Sodium formate | 10 | 3.5 | 1 | 55 | 97 |
| Sodium polystyrene sulfonate | 5 | 5.0 | 2 | 57 | 98 |
| Polyvinyl-benzyltrimethyl-ammonium chloride | 5 | 2.8 | 4 | 80 | 100 |
| Sodium dioctyl-sulfosuccinate | 10 | 2.0 | 10 | 92 | 100 |
| Sodium N,N-dimethyl-taurate | 10 | 1.5 | 20 | 96 | 100 |

EXAMPLE 11

One gram of sodium nitrate was incorporated in a mixed solution comprised of 54 g of N-methylpyrrolidone and 30 g of dimethylsulfoxide to obtain a uniform solution. 16 g of a polyaryl ether sulfone, similar to that used in Example 1, were dissolved in the so obtained solution, thereby to obtain a polymer dope. From this dope, a semipermeable membrane in the form of a hollow fiber having an inner diameter of 0.2 mm and an outer diameter of 0.4 mm was produced in a manner similar to that mentioned in Example 1.

Observation of a cross-section of the membrane by an electron microscope showed that the pore diameter increased progressively and continuously from the first and second major surfaces toward the center portion. The average diameter of the pores present in the center portion was approximately 0.05 micron. The water permeability was 2.1 m³/m².day.kg/cm², which was extremely low, compared with that of a hollow fiber produced by using an aqueous sodium nitrate solution in place of the sodium nitrate. The percentages cut-off of dextran molecules having an M.W. of 10,000, 500,000 and 70,000 were 10%, 100% and 90%, respectively.

EXAMPLE 12

80 ml of an aqueous 50% sodium nitrate solution were incorporated in a mixed solution comprised of 2,620 ml of dimethylformamide and 1,300 ml of propylene glycol to obtain a uniform solution. 750 g of a polyaryl ether sulfone similar to that used in Example 1, were dissolved in the so obtained solution, thereby to prepare a polymer dope. From this polymer dope, a semipermeable membrane in the form of a hollow fiber having an inner diameter of 0.2 mm and an outer diameter of 0.4 mm was produced in a manner similar to that mentioned in Example 1.

Observation of a cross-section of the membrane by using an electrone microscope showed that the membrane had two relatively dense surface layers adjacent to the first and second major surfaces, which surface layers had pores but no voids therein, and the pore diameter increased progressively and continuously from the two major surfaces toward the center portion. The average diameter of the pores present in the center portion was approximately 0.05 micron. The water permeability of the membrane was 5.8 m³/m².day.kg/cm². The percentages cut-off of dextran molecules having an average M.W. of 10,000, 500,000 and 70,000 were 5%, 99% and 86%, respectively.

What we claim is:

1. A polyaryl ether sulfone semipermeable membrane made of a polyaryl ether sulfone comprised of recurring units represented by the general formula (I):

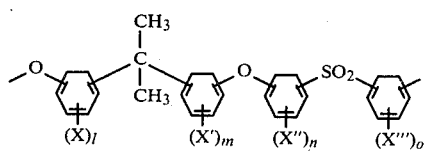

(I)

wherein X, X', X" and X''', which may be identical to or different from each other, are non-dissociative substituents, and l, m, n and o, which may be identical to or different from each other, are integers of from 0 to 4, which membrane has pores of a diameter increasing progressively and continuously from first and second major opposite surface layers of the membrane to the center portion thereof, which center portion is located approximately equidistant from the first and second major opposite surface layers and the membrane is comprised of a single continuous polymer phase; the diameter of the pores present on or in the immediate proximity of the first and second major surfaces being such that the percentage rejection of dextran molecules having an average molecular weight of 10,000 is not greater than 95%, the percentage rejection of dextran molecules having an average molecular weight of 70,000 is in the range of from 5% to 95% and the percentage rejection of dextran molecules having an average molecular weight of 500,000 is at least 5%, and; the average diameter of pores present in said center portion being in the range of from 0.05 to 10 microns.

2. A polyaryl ether sulfone semipermeable membrane according to claim 1, wherein the polyaryl ether sulfone has a number average molecular weight of from 5,000 to 50,000.

3. A polyaryl ether sulfone semipermeable membrane according to claim 1, wherein the polyaryl ether sulfone is comprised of recurring units represented by the formula (II):

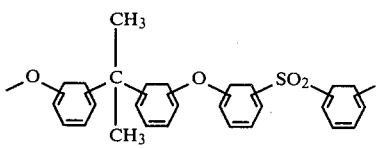

(II)

4. A polyaryl ether sulfone semipermeable membrane according to claim 1, wherein the polyaryl ether sulfone is comprised of recurring units represented by the formula (III):

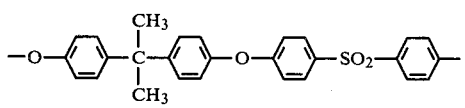

(III)

5. A polyaryl ether sulfone semipermeable membrane according to claim 1 which is in flat form.

6. A polyaryl ether sulfone semipermeable membrane according to claim 1 which is in the form of hollow fibers.

7. A polyaryl ether sulfone semipermeable membrane according to claim 6, wherein the hollow fibers have a wall thickness of from 10 to 100 microns.

8. A polyaryl ether sulfone semipermeable membrane according to claim 7, wherein the hollow fibers substantially have no voids of a size exceeding 10 microns in the wall.

* * * * *